US012633220B2

(12) United States Patent
Jeong

(10) Patent No.: US 12,633,220 B2
(45) Date of Patent: May 19, 2026

(54) METHOD AND APPARATUS FOR GENERATING A MEMORY PARKING ASSIST PATH

(71) Applicants: HYUNDAI MOTOR COMPANY, Seoul (KR); KIA CORPORATION, Seoul (KR)

(72) Inventor: Jin Han Jeong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/781,615

(22) Filed: Jul. 23, 2024

(65) Prior Publication Data

US 2025/0209919 A1      Jun. 26, 2025

(30) Foreign Application Priority Data

Dec. 21, 2023      (KR) ......................... 10-2023-0188998

(51) Int. Cl.
*G08G 1/16* (2006.01)
*B60W 30/06* (2006.01)
*G06T 7/70* (2017.01)
*G06V 20/58* (2022.01)

(52) U.S. Cl.
CPC ............. *G08G 1/168* (2013.01); *B60W 30/06* (2013.01); *G06T 7/70* (2017.01); *G06V 20/586* (2022.01)

(58) Field of Classification Search
None
See application file for complete search history.

(56) References Cited

U.S. PATENT DOCUMENTS

| | | | | |
|---|---|---|---|---|
| 2018/0312169 A1* | 11/2018 | Harai | ...................... | B60R 21/00 |
| 2020/0130696 A1* | 4/2020 | Xiao | ...................... | G01C 21/20 |
| 2021/0370917 A1* | 12/2021 | Ishinoda | ................ | G08G 1/168 |

FOREIGN PATENT DOCUMENTS

| | | | |
|---|---|---|---|
| KR | 101581286 B1 | 12/2015 | |
| KR | 102387603 B1 | 4/2022 | |
| KR | 20230081749 A | 6/2023 | |

* cited by examiner

*Primary Examiner* — Thomas S Mccormack
(74) *Attorney, Agent, or Firm* — Lempia Summerfield Katz LLC

(57) ABSTRACT

A method and an apparatus for generating a safe Memory Parking Assist path by considering perception and positioning errors due to distortion of an SVM wide-angle camera are disclosed. The method for generating a parking path includes obtaining images around a vehicle by cameras; obtaining position of the vehicle and obstacles around the vehicle by using images; activating a Memory Parking Assist (MPA) in response to a determination that the vehicle approaches a memory path; predicting whether the vehicle collides with any of the obstacles if the vehicle tracks the memory path; determining whether the obstacles are avoidable in response to a determination that the vehicle is predicted to collide with the obstacle; and generating an avoidance path for the vehicle to avoid the obstacle and a convergence path for the vehicle to converge to the memory path.

13 Claims, 11 Drawing Sheets

METHOD AND APPARATUS FOR GENERATING A MEMORY PARKING ASSIST PATH

CROSS-REFERENCE TO RELATED APPLICATION

This application claims priority to Korean Patent Application No. 10-2023-0188998, filed on Dec. 21, 2023 in the Korea Intellectual Property Office, the entire contents of which are incorporated herein by reference.

TECHNICAL FIELD

The present disclosure relates to a method and an apparatus for generating a Memory Parking path. More specifically, the present disclosure relates to a method and an apparatus for generating a safe Memory Parking path by considering perception and positioning errors due to distortion of a Surround View Monitor (SVM) wide-angle camera.

BACKGROUND

The statements in this section merely provide background information related to the present disclosure and do not necessarily constitute prior art.

Parking assistance technology may leverage autonomous driving technology and is under extensive development. Among the parking assistance functions, one notable function is a Memory Parking Assist (MPA) function.

The Memory Parking Assist function enables a vehicle to memory a parking path when a driver parks a vehicle in a path memory mode, and the Memory Parking Assist function automatically parks the vehicle in the corresponding parking space during the next parking session without the driver's intervention. The Memory Parking Assist function allows a driver to remotely park the vehicle in the same place based on the recorded memory path and thus relieves the driver's burden on the parking task.

A Memory Parking Assist apparatus controls a vehicle to follow a recorded memory path. The Memory Parking Assist apparatus utilizes information from a Surround View Monitor (SVM) wide-angle camera mounted on the vehicle to perceive the driving environment and vehicle position and subsequently generates a safe path.

SVM cameras use wide-angle lenses. Cameras with a wide-angle lens may generate images with a wide angle of view. In other words, an SVM wide-angle camera may obtain an image with a wide field of view even in a confined space and thus may reduce the need for a large number of cameras to capture the entire area.

However, a wide-angle lens inherently introduces a lens distortion and prevents the vehicle from accurately recognizing the position and distance of surrounding objects. Accordingly, positioning, which estimates the position of a vehicle based on information on the surrounding objects, inevitably introduces errors.

In the parking lot environment, various factors contribute to the uncertainty, such as a limited visibility due to other vehicles and a narrow driving road. If a vehicle attempts to follow a memory path by relying on perception and positioning information with errors, the vehicle may not faithfully follow the memory path in the parking lot environment. Occasionally, a situation may occur where the vehicle fails to converge to the memory path and collides with an obstacle.

Therefore, the Memory Parking Assist apparatus needs to find a path that safely converges from the initial vehicle position to the memory path by considering the kinematic behavior of the vehicle. The Memory Parking Assist apparatus uses an SVM wide-angle camera to capture information on the surrounding environment and estimate the vehicle's position. Since a wide-angle camera is used, perception and positioning errors occur. The Memory Parking Assist apparatus should consider the corresponding errors and design a safe path according to the driving situation and parking lot driving environment. The Memory Parking Assist apparatus should be able to design a path that safely avoids obstacles interfering with following the memory path and returns to the memory path using a collision prediction technique that takes the corresponding errors into account.

SUMMARY

In view of the above, one object of the present disclosure is to provide a method and an apparatus for generating a safe Memory Parking Assist path by considering perception and positioning errors due to distortion of a Surround View Monitor (SVM) wide-angle camera.

Technical objects to be achieved by the present disclosure are not limited to those described above, and other technical objects not mentioned above may also be clearly understood from the descriptions given below by those having ordinary skill in the art to which the present disclosure belongs.

In an embodiment of the present disclosure, a method for generating a parking path includes obtaining images around a vehicle by using cameras. The method also includes obtaining a position of the vehicle and obstacles around the vehicle by using images. The method also includes activating a Memory Parking Assist (MPA) in response to a determination that the vehicle approaches a memory path. The method also includes predicting whether the vehicle collides with any of the obstacles if the vehicle tracks the memory path. The method also includes determining whether the obstacles are avoidable in response to a determination that the vehicle is predicted to collide with the obstacle. The method also includes generating an avoidance path for the vehicle to avoid the obstacle. The method also includes generating a convergence path for the vehicle to converge to the memory path.

According to an embodiment of the present disclosure, a Memory Parking Assist path may be generated by considering perception and positioning errors due to the use of an SVM wide-angle camera, and thus safer autonomous parking may be achieved.

According to an embodiment of the present disclosure, the vehicle margin may be designed in more detail, and thus safer autonomous parking in a parking lot environment in which a vehicle has to navigate along narrow roads with high curvature may be achieved.

The advantageous effects of the present disclosure are not limited to those described above. Other advantageous effects of the present disclosure not mentioned above may be understood clearly by those having ordinary skill in the art from the descriptions given below.

DETAILED DESCRIPTION

Figure 1:
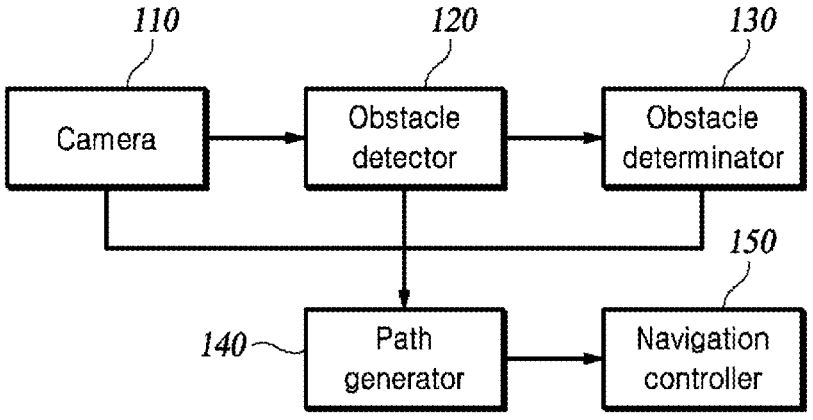
FIG. 1 is a block diagram briefly illustrating an internal structure of a Memory Parking Assist apparatus according to one embodiment of the present disclosure.

Hereinafter, embodiments of the present disclosure are described in detail with reference to the accompanying drawings. In the following description, like reference numerals preferably designate like elements, although the elements are shown in different drawings. Further, in the following description of the embodiments, a detailed description of known functions and configurations incorporated therein has been omitted for the purpose of clarity and for brevity.

Additionally, various terms such as first, second, A, B, (a), (b), etc., are used solely to differentiate one component from the other but not to imply or suggest the substances, order, or sequence of the components. Throughout the present disclosure, when a part 'includes' or 'comprises' a component, the part is intended to further include other components, and not intended to exclude other components unless specifically stated to the contrary. The terms such as 'unit', 'module', and the like refer to one or more units for processing at least one function or operation, which may be implemented by hardware, software, or a combination thereof. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

The following detailed description, together with the accompanying drawings, is intended to describe embodi-ments of the present invention and is not intended to represent the only embodiments in which the present disclosure may be practiced.

Memory Parking Assist (MPA) is a function in which the vehicle memories the parking path when the driver parks, and the MPA automatically parks the vehicle in the same parking space during the next time without driver interven-tion.

FIG. 1 is a block diagram briefly illustrating an internal structure of a Memory Parking Assist apparatus according to one embodiment of the present disclosure.

As shown in FIG. 1, a Memory Parking Assist apparatus according to one embodiment of the present disclosure may comprise all or some of a camera 110, an obstacle detector 120, an obstacle determinator 130, a path generator 140, and a navigation controller 150.

It should be noted that not all the constituting elements shown in FIG. 1 are essential constituting elements, and some of the blocks included in the apparatus for generating a safe Memory Parking Assist path may be added, modified, or deleted. Meanwhile, the constituting elements of FIG. 1 represent functionally distinct elements, and at least one or more constituting elements may be implemented in an integrated form in an actual physical environment.

The camera 110 includes Surround View Monitor (SVM) wide-angle cameras. The SVM cameras, mounted on a vehicle, capture the images of surrounding areas of the vehicle. According to one embodiment of the present dis-closure, the SVM cameras may capture the images of vehicles, pillars, and/or parking lines in a parking lot. The SVM cameras may be installed at one or more locations, capturing images of the front, rear, and sides of the vehicle. However, the present disclosure is not limited to the specific description and may vary according to specific applications.

The obstacle detector 120 may recognize the space within the parking lot based on the images obtained from the camera 110. The obstacle detector 120 may obtain the positions of other vehicles, pillars, and parking lines in the parking lot and may generate a map of the parking lot using the obtained positions.

The obstacle detector 120 may generate point cloud data representing obstacles based on the images from the camera 110. The obstacle detector 120 clusters the point cloud data. Here, clustering refers to a machine learning technique, which classifies data with similar characteristics into the same group. Since specific methods for clustering points representing a single obstacle from a point cloud data are well-known to the technical field of the art, detailed descrip-tions thereof have been omitted. The present disclosure, therefore, does not limit the clustering method to a specific approach. According to the embodiments, the obstacle detector 120 may obtain data on which preprocessing and/or clustering have/has been performed in the camera 110.

The obstacle detector 120 simplifies each cluster. Each cluster contains a large number of points. The obstacle detector 120 replaces a large number of points with, for example, two or three points, to simplify each cluster. The obstacle detector 120 may distinguish adjacent obstacles and may obtain position and orientation information of the obstacles by connecting the two or three points selected within each cluster.

The obstacle determinator 130 searches a memory-path navigation area using the data obtained by the obstacle detector 120. The obstacle determinator 130 determines whether the vehicle collides with an obstacle within the navigation area while the vehicle moves along the memory-path. If it is determined that the vehicles are anticipated to collide with an obstacle within the navigation area, the obstacle determinator 130 determines whether the corresponding obstacle may be avoided.

The path generator 140 may generate an autonomous parking path along which the vehicle near the memory-path may converge to the memory-path using the information received from the camera 110.

The path generator 140 may generate an autonomous parking path along which the vehicle may navigate without colliding with an obstacle using the information received from the obstacle detector 120 and the obstacle determinator 130.

The navigation controller 150 may control the motion of the vehicle. The navigation controller 150 may generate a signal for controlling the motion of the vehicle according to an autonomous navigation path. The navigation controller 150 may electrically control various vehicle drive devices within the vehicle through the generated signal. The vehicle drive devices may include a steering device, braking device, suspension device, and/or powertrain.

Figure 2:
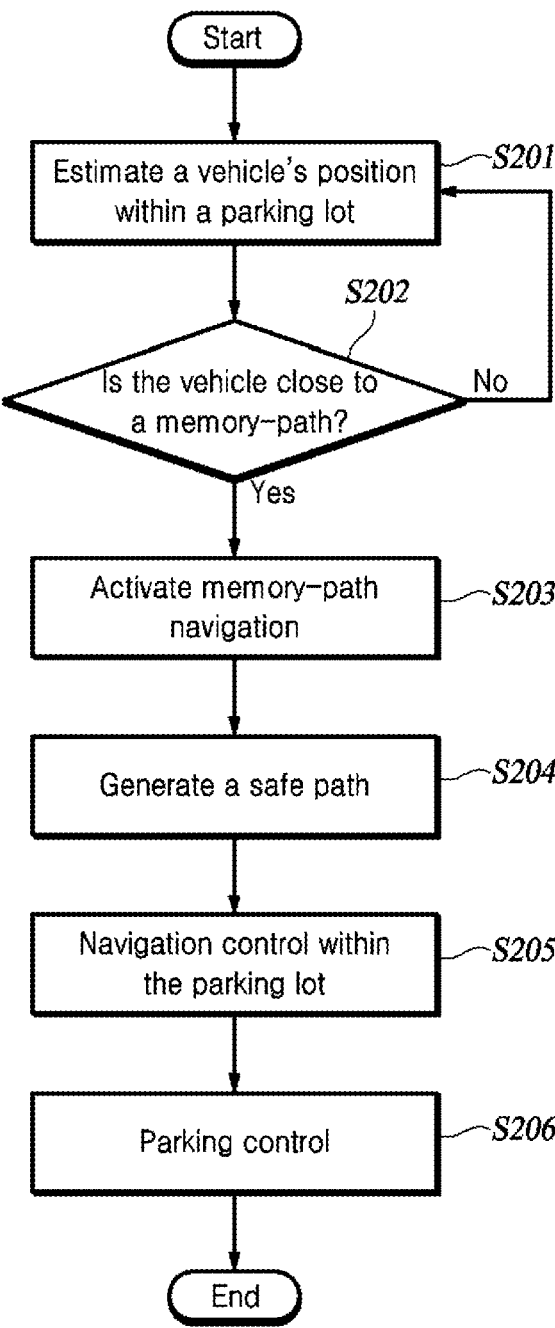
FIG. 2 is a flow diagram illustrating the overall operation flow of a Memory Parking Assist function according to one embodiment of the present disclosure.

FIG. 2 is a flow diagram illustrating the overall operation flow of a Memory Parking Assist function according to one embodiment of the present disclosure.

When a vehicle enters a parking lot, the position of the vehicle in the parking lot is estimated to activate the Memory Parking Assist function (S201). The Memory Parking Assist apparatus utilizes a pre-recorded driving path. The Memory Parking Assist apparatus determines whether the vehicle is close to the memory-path (S202). If the vehicle is not close to the memory-path (No in S202), the vehicle position within the parking lot is periodically updated to determine whether the vehicle is close to the memory-path (S201 and S202).

If the vehicle is close to the memory-path (Yes in S202), the vehicle activates the memory path navigation function (S203). When following a pre-stored memory-path, the vehicle determines whether a navigation problem occurs, such as collision with an obstacle. If the vehicle determines that the pre-stored memory-path is inappropriate, the vehicle creates a new safety path (S204). The vehicle navigates to the destination parking position using a parking lot navigation control system (S205). When the vehicle reaches the parking position, the vehicle safely parks at the parking position using the parking control system (S206).

Figure 3:
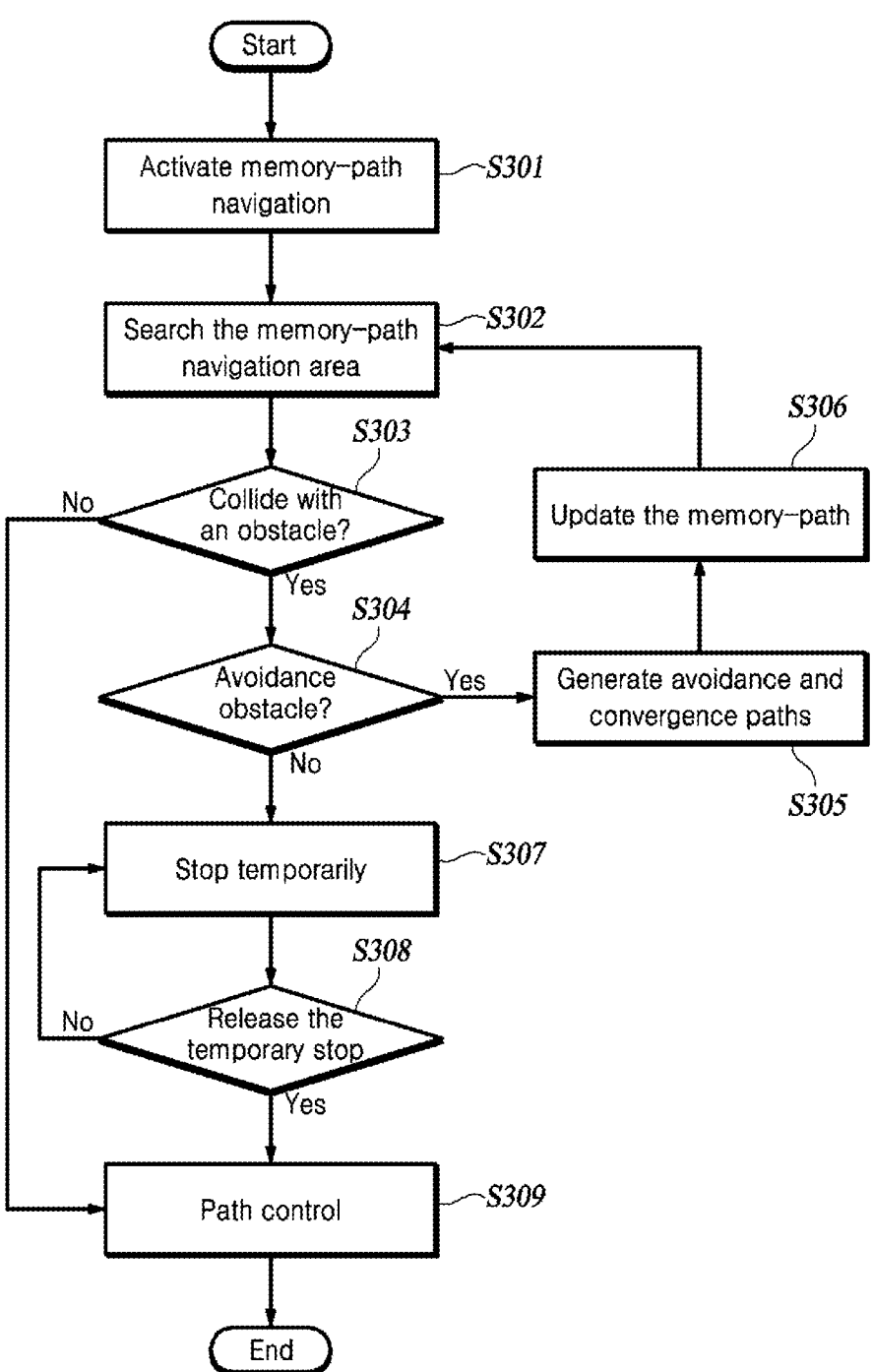
FIG. 3 is a flow diagram illustrating a detailed operation flow of a Memory Parking Assist function according to one embodiment of the present disclosure.

FIG. 3 is a flow diagram illustrating a detailed operation flow of a Memory Parking Assist function according to one embodiment of the present disclosure. FIG. 3 shows a series of procedures (S203 to S205 steps of FIG. 2) for generating a safe path and controlling navigation in a parking lot after a vehicle determines that it has approached close to a memory-path.

When entering the parking lot, the vehicle activates the Memory Parking Assist function if it determines that it is close to the memory-path (S301).

The Memory Parking Assist apparatus generates a navigation area on the memory-path and searches for an obstacle existing within the navigation area (S302).

When the vehicle moves along the memory-path, the Memory Parking Assist apparatus determines whether the vehicle collides with an obstacle in the navigation area (S303). If the Memory Parking Assist apparatus determines that the vehicle will not collide with an obstacle even if the vehicle tracks the memory-path (No in S303), the Memory Parking Assist apparatus performs memory path tracking control (S309). A specific method for determining whether the vehicle is anticipated to collide with an obstacle is described in detail with reference to FIGS. 4-6. A specific method by which the vehicle converges to the memory-path is described in detail with reference to FIG. 7.

If the Memory Parking Assist apparatus determines that the vehicle will collide with an obstacle when following the memory path (Yes in S303), the Memory Parking Assist apparatus determines whether the collision obstacle is an avoidance obstacle (S304). An avoidance obstacle refers to an obstacle that minimally encroaches on the vehicle's navigation area, allowing the Memory Parking Assist apparatus to generate an avoidance path. If an obstacle occupies a significant portion of the vehicle's navigation area and the vehicle is unable to move, the corresponding obstacle may not be classified as an avoidance obstacle. For example, if another vehicle is in the process of parking and obstructs the road within the parking lot, the corresponding vehicle may not be classified as an avoidance obstacle.

The Memory Parking Assist apparatus may determine whether the collision obstacle searched in the S302 step is an avoidance obstacle (S304). In the S304 step, if the Memory Parking Assist apparatus determines that a portion of area occupied by the obstacle is significant (No in S304), the Memory Parking Assist apparatus temporarily stops the vehicle (S307). The Memory Parking Assist apparatus determines whether the obstacle has disappeared or has been removed after temporary stopping of the vehicle (S308). The Memory Parking Assist apparatus maintains the temporary stopping state (S307) when the obstacle persists (No in S308). When the Memory Parking Assist apparatus determines that the obstacle has been removed (Yes in S308), the Memory Parking Assist apparatus performs memory path tracking control (S309).

In the S304 step, if the Memory Parking Assist apparatus determines that a portion of area occupied by an obstacle is not significant (Yes in S304), the Memory Parking Assist apparatus classifies the corresponding obstacle as an avoidance obstacle and generates avoidance and convergence paths (S305). A specific method for generating avoidance and convergence paths will be described in detail with reference to FIGS. 8A-8D.

When avoidance and convergence paths are generated, the Memory Parking Assist apparatus stores the avoidance and convergence paths as a new memory-path (S306). Subsequently, if the Memory Parking Assist function is activated in the same parking lot, the Memory Parking Assist apparatus performs Memory Parking Assist using the updated memory-path.

After updating the memory-path, the Memory Parking Assist apparatus returns to the S302 step. The Memory Parking Assist apparatus determines whether there are changes in the parking lot environment, and a collision obstacle or an avoidance obstacle has emerged during the process of updating the memory-path (S303 and S304). In the absence of a collision obstacle or an avoidance obstacle, the Memory Parking Assist apparatus performs path tracking control using the updated memory path S309.

Figure 4:
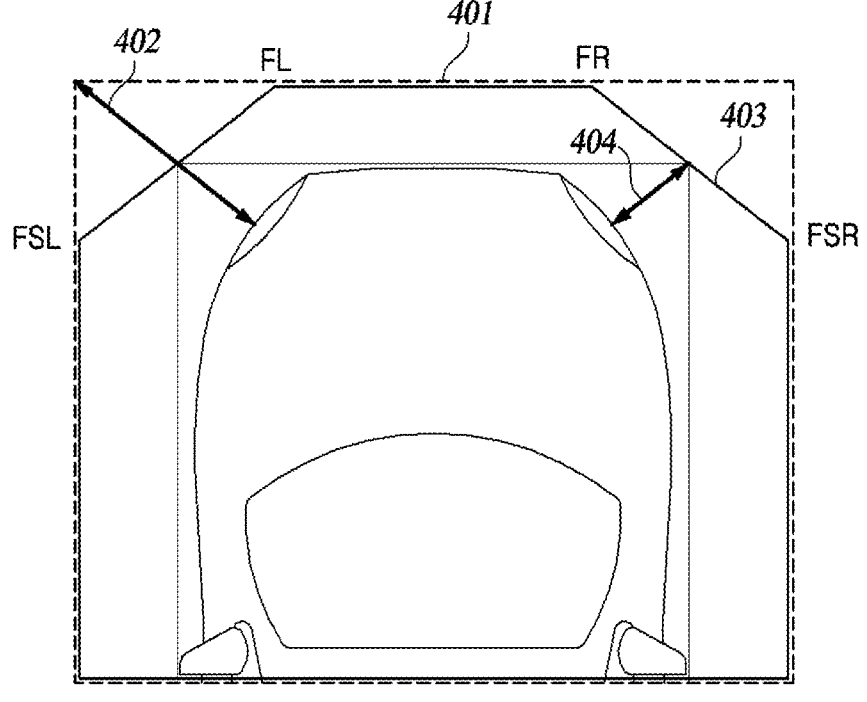
FIG. 4 illustrates a front shape of the vehicle margin used in a general road environment and the vehicle margin employed in one embodiment of the present disclosure.

FIG. 4 illustrates a front shape of the vehicle margin used in a general road environment and the vehicle margin employed in one embodiment of the present disclosure. The dotted line 401 of FIG. 4 represents the conventional vehicle margin, while the solid line 403 represents the vehicle margin according to one embodiment of the present disclosure.

The vehicle margin refers to a reference point or a reference line used to determine if the vehicle is predicted to collide with an obstacle. The Memory Parking Assist apparatus determines a collision if the vehicle margin comes into contact with the obstacle.

The present disclosure applies a more specifically designed vehicle margin compared to the prior art for predicting whether the vehicle collides with an obstacle (S503), determining whether the obstacle is an avoidance obstacle (S304), and generating avoidance and convergence paths (S305) performed by the Memory Parking Assist apparatus.

In FIG. 4, the long straight line 402 represents the length measured from the front bumper of a vehicle in the diagonal direction when the conventional vehicle margin design is applied. The short straight line 404 represent the length measured from the front bumper of the vehicle in the diagonal direction when the vehicle margin design according to one embodiment of the present disclosure is applied. In the following description, the length measured from the front bumper of the vehicle in the diagonal direction is simply referred to as the length of a round margin.

Conventional vehicle margins have a rectangular shape. If a rectangular-shaped margin is applied, the round margin length 402 becomes longer.

Roads in the parking lot environments are typically narrow. In the parking lot environment, vehicles need to navigate along a narrow road with high curvature. Situations involving a vehicle navigating along a path with high curvature include navigating with a full turn in a parking lot intersection, along T-shaped road, or along a U-shaped road.

Since conventional vehicle margins are designed assuming a general road environment, the conventional vehicle margins are not suitable for use in a parking lot environment. If the conventional vehicle margin is applied to the parking lot environment, an automatic parking system may determine that a vehicle and an obstacle will collide even if the obstacle is at a safe distance. The automatic parking system may determine that an excessive avoidance path or an avoidance path may not be generated. In other words, due to the characteristics of a parking lot environment, which requires navigation along narrow roads with high curvature, it is not suitable to apply the vehicle margin design used in the general road environment directly to the parking lot environment.

A vehicle margin design according to one embodiment of the present disclosure designs the vehicle margin based on various positions (including FL, FR, FSL, and FSR). If the vehicle margin according to one embodiment of the present disclosure is applied, the length 404 of the round margin becomes shorter than the length 402 of the existing round margin. Based on this feature, the automatic parking system may avoid wrongly deciding that an obstacle at a safe distance collides with the vehicle. The automatic parking system may generate an avoidance path that does not significantly deviates from the memory path.

Figure 5:
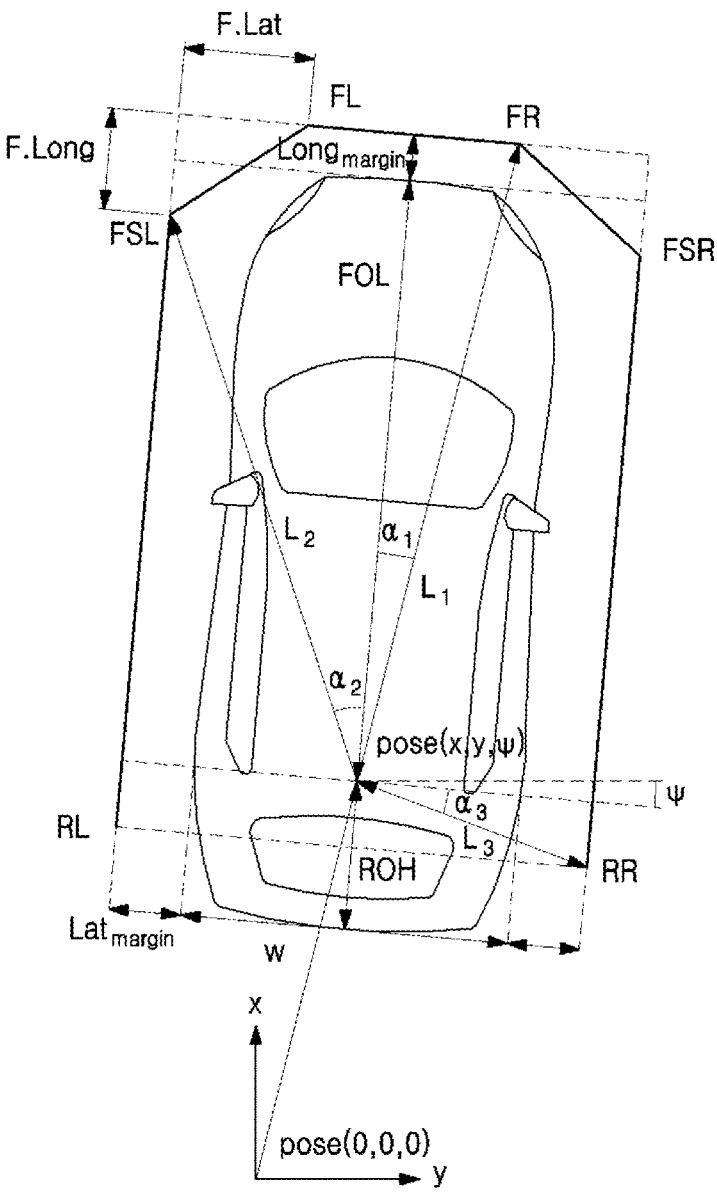
FIG. 5 illustrates a method for designing a vehicle margin according to one embodiment of the present disclosure.

FIG. 5 illustrates a method for designing a vehicle margin according to one embodiment of the present disclosure. FIG. 5 illustrates a case in which a vehicle moves from the initial pose (0, 0, 0) to the next pose (x, y, ψ). Pose refers to the information that includes a vehicle's position (x and y coordinate values in the 3D coordinate system) and orientation information (angle measured around z-axis in the 3D coordinate system, i.e., heading angle of the vehicle).

In FIG. 5, Fore Left (FL) represents the front left point of the vehicle margin, Fore Right (FR) represents the front right point of the vehicle margin, Fore Side Left (FSL) represents the front left side point of the vehicle margin, Fore Side Right (FSR) represents the front right side point of the vehicle margin, Rear Left (RL) represents the rear left point of the vehicle margin, and Rear Right (RR) represents the rear right point of the vehicle margin.

In FIG. 5, w represents the horizontal width of the vehicle, FOL represents the distance from the center of the rear axle of the vehicle to the front bumper, and ROH represents the distance from the rear axle of the vehicle to the rear bumper. In FIG. 5, $Long_{margin}$ represents the longitudinal margin of the vehicle front, and $Lat_{margin}$ represents the lateral margin of the vehicle side. In FIG. 5, $L_1$ represents the length from the center of the rear axle of the vehicle to FR or FL; $\alpha_1$ represents the angle formed by the straight line $L_1$ with the straight line FOL; $L_2$ represents the length from the center of the rear axle to FSR or FSL; $\alpha_2$ represents the angle formed by the straight line $L_2$ with the straight line FOL; $L_3$ represents the length from the center of the rear axle of the vehicle to RR or RL; and $\alpha_3$ represents the angle formed by the straight line $L_3$ with a straight line perpendicular to FOL.

In the conventional margin design, the vehicle margin is modeled as a rectangular shape. However, as shown in FIG. 5, the vehicle margin according to one embodiment of the present disclosure may be modeled as a polygonal shape formed by connecting four or more points (FL, FR, FSL, FSR, RL, and RR).

As shown in FIG. 5, when the vehicle attempts to move from the initial pose (0, 0, 0) to the next pose (x, y, ψ), the coordinates of each point (FL, FR, FSL, FSR, RL, and RR) may be calculated through Eqs. 1 to 3 below.

$$Lat_{margin} = 0.3 \qquad \text{[Eq. 1]}$$

$$Long_{margin} = 0.2$$

$$F.Lat = Lat_{margin} + 0.1$$

$$F.Long = Long_{margin} + 0.1$$

In Eq. 1, the unit is in meters.

According to the present embodiment, the lateral margin of the vehicle side $Lat_{margin}$ is 0.3 m, and the longitudinal margin of the vehicle front $Long_{margin}$ is 0.2 m.

F.Lat is a value obtained by adding a predetermined length to $Lat_{margin}$, and F.Lat according to the present embodiment is a value obtained by adding 0.1 m to $Lat_{margin}$. F.Long is a value obtained by adding a predetermined value to $Long_{margin}$, and F.Long according to the present embodiment is a value obtained by adding 0.1 m to $Long_{margin}$. By adding a predetermined length to F.Lat and F.Long, a round margin length for predicting obstacle collisions suitable for a parking lot environment may be set.

The values of Eq. 1 set for the respective variables are only examples; it should be understood by those having ordinary skill in the art to which the present disclosure belongs that the values of the respective variables according to the embodiments of the present disclosure may be adjusted in various ways without compromising their inherent characteristics.

Eq. 2 calculates $L_1$, $\alpha_1$, $L_2$, $\alpha_2$, $L_3$, and $\alpha_3$ using the results of Eq. 1.

$$L_1 = \sqrt{\left(FOL + Long_{margin}\right)^2 + \left(\frac{w}{2} + Lat_{margin} - F.Lat\right)^2} \qquad \text{[Eq. 2]}$$

$$\alpha_1 = \arctan\left(\frac{\frac{w}{2} + Lat_{margin} - F.Lat}{FOL + Long_{margin}}\right)$$

$$L_2 = \sqrt{\left(FOL + Long_{margin} - F.Long\right)^2 + \left(\frac{w}{2} + Lat_{margin}\right)^2}$$

-continued $$\alpha_2 = \arctan\left(\frac{\frac{w}{2} + Lat_{margin}}{FOL + Long_{margin}}\right)$$

$$L_3 = \sqrt{\left(\frac{ROH}{2}\right)^2 + \left(\frac{w}{2} + Lat_{margin}\right)^2}$$

$$\alpha_3 = \arctan\left(\frac{\frac{w}{2} + Lat_{margin}}{\frac{ROH}{2}}\right)$$

Eq. 2 may calculate the length $L_1$ from the center of the rear axle of the vehicle to FR or FL, angle $\alpha_1$ formed between the straight line $L_1$ and the straight line FOL, length $L_2$ from the center of the rear axle of the vehicle to FSR or FSL, angle $\alpha_2$ formed between the straight line $L_2$ and the straight line FOL, length $L_3$ from the center of the rear axle of the vehicle to RR or RL, and angle $\alpha_3$ formed between the straight line $L_3$ and the straight line FOL.

Since those having ordinary skill in the art to which the present disclosure belongs may easily derive Eq. 2, which calculates lengths and angles using Pythagorean theorem and trigonometric functions, detailed descriptions of Eq. 2 have been omitted.

Eq. 3 calculates the coordinates of FL, FR, FSL, FSR, RL, and RR using the results of Eq. 2.

$$FL = [x + L_1 \cdot \cos(\Psi + \alpha_1), \ y + L_1 \cdot \sin(\Psi + \alpha_1)] \qquad \text{[Eq. 3]}$$

$$FR = [x + L_1 \cdot \cos(\Psi - \alpha_1), \ y + L_1 \cdot \sin(\Psi - \alpha_1)]$$

$$FSL = [x + L_2 \cdot \cos(\Psi + \alpha_2), \ y + L_2 \cdot \sin(\Psi + \alpha_2)]$$

$$FSR = [x + L_2 \cdot \cos(\Psi - \alpha_2), \ y + L_2 \cdot \sin(\Psi - \alpha_2)]$$

$$RL = [x + L_3 \cdot \cos(\Psi - \alpha_3), \ y + L_3 \cdot \sin(\Psi - \alpha_3)]$$

$$RR = [x + L_3 \cdot \cos(\Psi + \alpha_3), \ y + L_3 \cdot \sin(\Psi + \alpha_3)]$$

In Eq. 3, x represents the distance for a vehicle to move from its current position along the x-axis, y represents the distance for the vehicle to move from its current position along the y-axis, and $\Psi$ represents the heading angle at a destination position when the current heading angle of the vehicle is assumed to be 0.

When the calculation results of Eq. 2 are substituted to Eq. 3, the coordinates of FL, FR, FSL, FSR, RL, and RR at the vehicle's next pose (x, y, $\psi$) may be calculated.

Since those having ordinary skill in the art to which the present disclosure belongs may easily derive Eq. 3, which calculates the coordinates using Cartesian coordinate system and trigonometric functions, detailed descriptions of Eq. 3 have been omitted.

In the step of predicting obstacle collision (S303) of FIG. 3, the vehicle margin design shown in FIG. 5 is applied when prediction of whether the vehicle collides with another vehicle or an obstacle in the parking lot is performed. The obstacle determinator 130 determines whether the vehicle collides with an obstacle within the parking lot when the vehicle tracks a path using the coordinates of FL, FR, FSL, FSR, RL, and RR at the vehicle's next pose (x, y, $\psi$) calculated using Eqs. 1 to 3.

The step S305 of generating avoidance and convergence paths of FIG. 3 also generates a path that avoids a collision with an obstacle by applying the vehicle margin design illustrated in FIG. 5.

Figure 6:
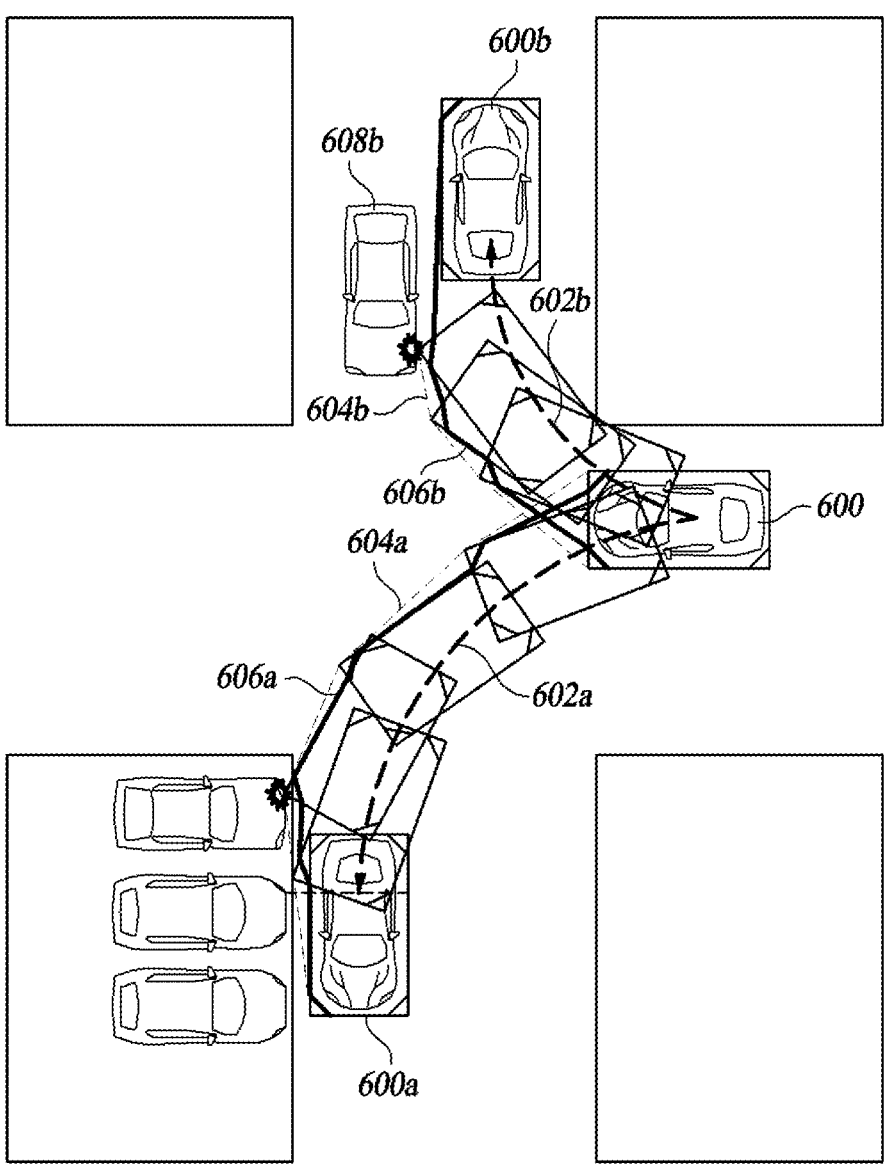
FIG. 6 illustrates a collision prediction result according to a vehicle margin design method for predicting whether a vehicle collides with an obstacle at an intersection with narrow roads.

FIG. 6 illustrates a collision prediction result according to a vehicle margin design method for predicting whether a vehicle collides with an obstacle at an intersection with narrow roads. FIG. 6 shows a problem encountered when collision prediction is performed by applying the existing vehicle margin design in a parking lot environment. FIG. 6 shows an improved effect obtained when collision prediction is performed by applying vehicle margin according to one embodiment of the present disclosure.

The vehicle predicts whether the vehicle collides with an obstacle before following a memory-path leading from the current position 600 to the next position 600a or 600b.

When the vehicle in FIG. 6 makes a left turn and navigates along the memory-path 602a, the vehicle may move from the current position 600 to the next position 600a. Before tracking the memory-path 602a, the Memory Parking Assist apparatus predicts whether the vehicle collides with an obstacle 608a if the vehicle navigates along the memory-path 602a.

In FIG. 6, the dotted line 604a is a boundary line based on which the Memory Parking Assist apparatus determines that the vehicle will collide with the obstacle 608a when the existing rectangular vehicle margin is applied. Using the existing rectangular margin increases the vehicle's collision area. The Memory Parking Assist apparatus determines that if the vehicle follows the memory-path 602a, the vehicle will collide with the obstacle 608a. The Memory Parking Assist apparatus determines that an avoidance path has to be generated or the vehicle has to stop temporarily.

In FIG. 6, the solid line 606a is a boundary line based on which the Memory Parking Assist apparatus determines that the vehicle collides with the obstacle 608a when the vehicle margin according to one embodiment of the present disclosure is applied. When using a detailed vehicle margin, the vehicle's collision area becomes relatively narrow. The Memory Parking Assist apparatus determines that the vehicle will not collide with the obstacle 608a even if the vehicle follows the existing memory-path 602a. The Memory Parking Assist apparatus may perform tracking control to follow the memory-path instead of generating an avoidance path or making a temporary stop.

Another example of FIG. 6 is related to the case in which the vehicle makes a right turn. In the corresponding example, if the vehicle tracks the memory-path 602b, the vehicle navigates along a path with high curvature.

In another example of FIG. 6, the dotted line 604b is a boundary line based on which the Memory Parking Assist apparatus determines that the vehicle will collide with a righthand obstacle when the existing rectangular vehicle margin is applied. Using the existing rectangular margin increases the vehicle's collision area. When the vehicle navigates narrow roads with high curvature, the Memory Parking Assist apparatus frequently determines that the vehicle will collide with the right-side obstacle 608b. The Memory Parking Assist apparatus determines that an avoidance path has to be generated or the vehicle has to stop temporarily.

In another example of FIG. 6, the solid line 606b is a boundary line based on which the Memory Parking Assist apparatus determines that the vehicle collides with the righthand obstacle 608b when the detailed vehicle margin according to one embodiment of the present disclosure is applied. When using the detailed vehicle margin, the vehicle's collision area becomes relatively narrow. The Memory Parking Assist apparatus determines that the vehicle will not collide with the obstacle 608b even if the vehicle follows the memory-path 602b. The Memory Parking Assist apparatus may perform tracking control to follow the memory-path instead of generating an avoidance path or making a temporary stop.

FIG. 6 shows an improved effect obtained when collision is predicted using the vehicle margin according to one embodiment of the present disclosure. If the vehicle margin is designed in detail, the Memory Parking Assist apparatus may prevent frequent generation of avoidance paths and update of the memory-path. If the vehicle margin is designed in detail, unnecessary calculations by the Memory Parking Assist apparatus may be reduced.

A path guiding the vehicle from its current position to the memory-path during the step S302 of searching a memory-path navigation area and a path guiding the vehicle from an avoidance position to the memory-path during the step S305 of generating avoidance and convergence paths are based on clothoids.

A clothoid is a type of transition curve. A transition curve (transition section) refers to a curve (section) in which the curvature of the curve changes linearly with the curve length. The transition section is a path section that connects both paths so that a vehicle may drive safely and comfortably when moving between a straight line and a curve or between curves with different curvatures. Since the step S305 of generating avoidance and convergence paths basically requires generation of a path for safe vehicle navigation, embodiments of the present disclosure by default generate a path based on clothoids.

However, path generation according to the present disclosure is not limited to the path generation based on clothoids. The path according to the present disclosure may be generated based on various transition curves, including Lemniscate, cubic parabola, and others, in addition to the clothoid.

Figure 7:
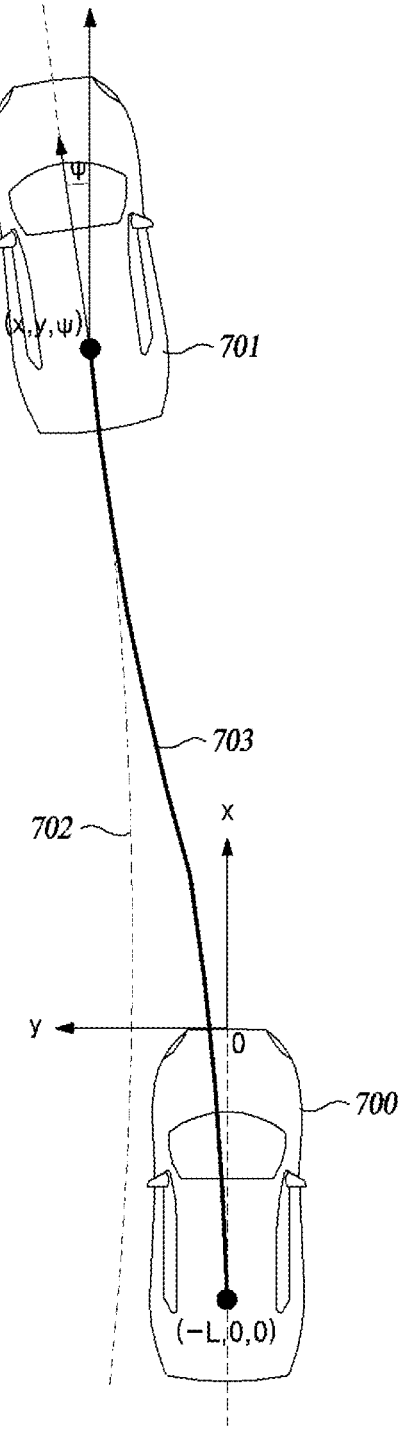
FIG. 7 illustrates a clothoid path for a vehicle to follow a memory path in a Memory Parking Assist method according to one embodiment of the present disclosure.

FIG. 7 illustrates a clothoid path 703 for a vehicle 700 to follow a memory-path 702 in a Memory Parking Assist method according to one embodiment of the present disclosure.

The vehicle 700 generates a clothoid path based on its initial pose and target pose. More specifically, the vehicle near the memory-path 702 may generate the clothoid path 703 shown in FIG. 7 by using the G1 Hermite interpolation with the initial pose $(-L, 0, 0)$ at the center of rear axle of the vehicle 700 and the target pose $(x, y, \psi)$ as inputs. Since a specific method for calculating clothoid parameters using the initial and target poses of the vehicle as inputs and generating a clothoid path is well-known to the public, detailed descriptions thereof have been omitted.

If a path generation method according to one embodiment of the present disclosure is applied, a vehicle may safely converge to a memory-path from the vehicle's initial pose when the vehicle is close to the memory-path within a parking lot.

If a path generation method according to one embodiment of the present disclosure is applied, a vehicle may safely converge to a memory-path from a position resulting after the vehicle avoids an obstacle.

If a path generation method according to one embodiment of the present disclosure is applied, a vehicle may safely converge to a memory-path even if the vehicle deviates from the memory-path due to the occurrence of a perception error, a positioning error, or a control error.

FIGS. 8A-8D illustrate processes in which a Memory Parking Assist apparatus according to one embodiment of the present disclosure determines whether a vehicle collides with or avoids an obstacle and generates avoidance and convergence paths.

If an obstacle in a navigation area is determined to be an avoidance obstacle after performing prediction of obstacle collision (S303) and determination of an avoidance obstacle (S304), the Memory Parking Assist apparatus generates an avoidance path to avoid the corresponding obstacle and a convergence path to return to the memory-path (S305). In what follows, with reference to FIGS. 8A-8D, a process of generating avoidance and convergence paths by a Memory Parking Assist apparatus will be described in more detail.

Figure 8A:
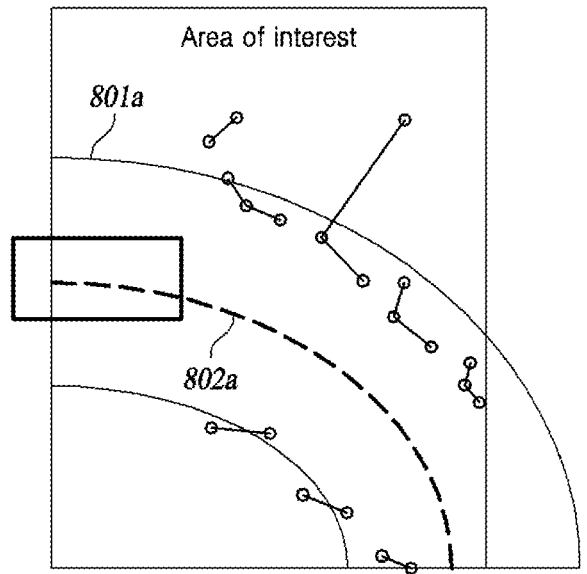
FIGS. 8A-8D illustrate processes in which a Memory Parking Assist apparatus according to one embodiment of the present disclosure determines whether a vehicle collides with or avoids an obstacle and generates avoidance and convergence paths.

FIG. 8A shows a navigation area 802*a* according to the memory-path 801*a* and a result of an obstacle search within the area of interest. The vehicle may classify obstacles likely to collide with the vehicle among a plurality of obstacles. In FIG. 8A, circular dots represent obstacles with a possibility of collision.

Figure 8B:
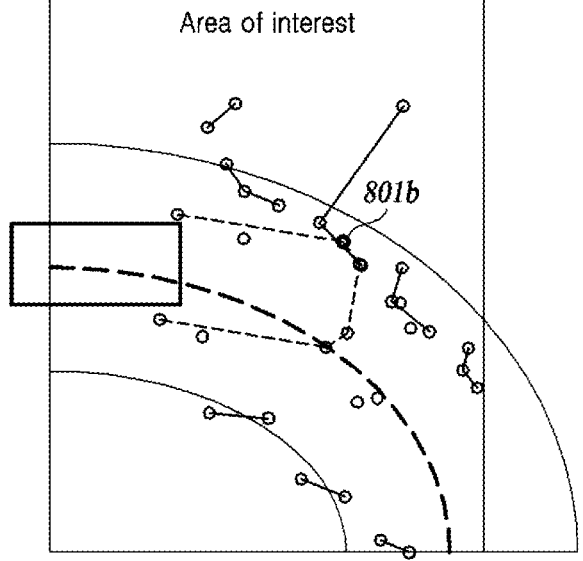

FIG. 8B shows an obstacle collision prediction process that predicts whether a vehicle will collide with obstacles in the navigation area when the vehicle navigates along a memory-path. FIG. 8B shows a point 801*b* where the vehicle collides with an obstacle when navigating along the memory-path. When the collision point 801*b* occurs, the Memory Parking Assist apparatus determines whether the obstacle at the collision point 801*b* is an avoidance obstacle. In the present example, the corresponding obstacle is classified as an avoidance obstacle.

Figure 8C:
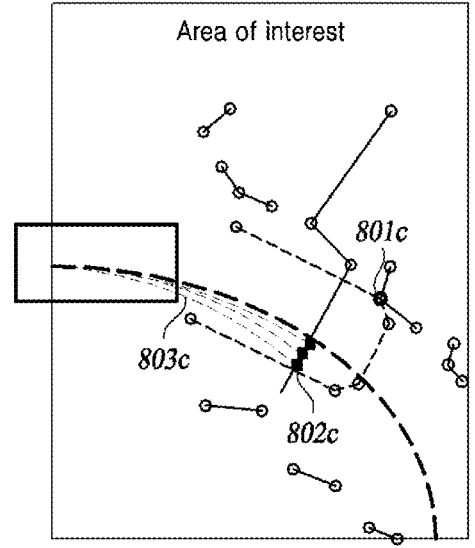

FIG. 8C shows a process for generating an avoidance path 803*c* by the Memory Parking Assist apparatus. The Memory Parking Assist apparatus draws a virtual straight line, which passes the collision point 801*b* and is perpendicular to the memory-path 802*a*, and sets an avoidance point 802*c* on the straight line in a direction away from the avoidance obstacle. The Memory Parking Assist apparatus generates a clothoid path connecting the current position of the vehicle and the avoidance point 802*c*. The Memory Parking Assist apparatus determines whether a collision with an obstacle occurs on the corresponding clothoid path. FIG. 8C shows a point 801*c* where the vehicle collides with another obstacle within the navigation area when a clothoid path is generated using the initial avoidance point 802*c*. The Memory Parking Assist apparatus reconfigures the avoidance point 802*c* until an avoidance path 803*c* is generated, which ensures that the vehicle does not collide with obstacles within the navigation area.

Figure 8D:
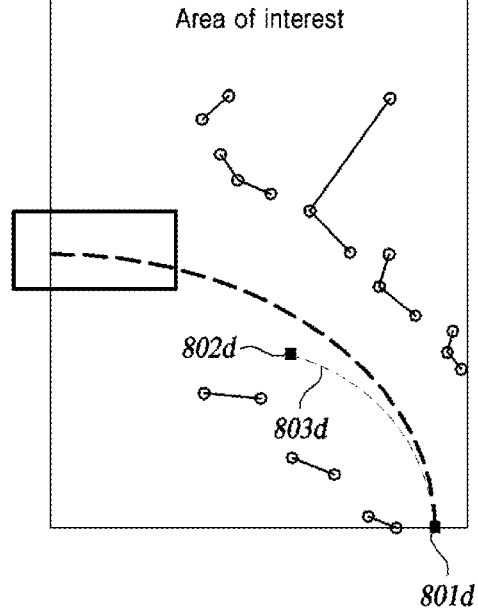

FIG. 8D shows a process for generating a convergence path 803*d* by the Memory Parking Assist apparatus. The Memory Parking Assist apparatus sets a return point 801*d* on the memory-path 802*a*. The return point 801*d* is set at a position separated from the avoidance point 802*d* by a sufficient distance so that a vehicle which has deviated from the memory-path may safely return to the memory-path. The Memory Parking Assist apparatus generates a clothoid path connecting the avoidance point 802*d* and the return point 801*d*. The Memory Parking Assist apparatus predicts whether the vehicle collides with an obstacle on the corresponding clothoid path. The Memory Parking Assist apparatus reconfigures the return point 801*d* until a convergence path 803*d* is generated, which ensures that the vehicle does not collide with obstacles within the navigation area.

If an avoidance path 803*c* and a convergence path 803*d* are generated, the Memory Parking Assist apparatus according to one embodiment of the present disclosure updates the avoidance path 803*c* and the convergence path 803*d* as a new memory-path S306.

In another embodiment of the present disclosure, the Memory Parking Assist apparatus may decrease the vehicle margin compared to the previous setting after updating the memory-path to prevent frequent update of the memory-path. The vehicle margin may be set by adjusting one or more values of $Lat_{margin}$, $Long_{margin}$, F.Lat, and F.Long.

Figure 9A:
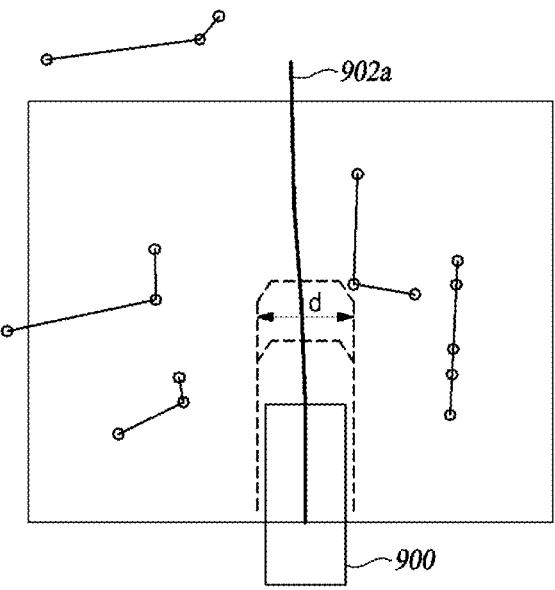
FIGS. 9A and 9B illustrate generation of a safe path that considers a perception error due to a wide-angle camera by a Memory Parking Assist apparatus according to one embodiment of the present disclosure.
Figure 9B:
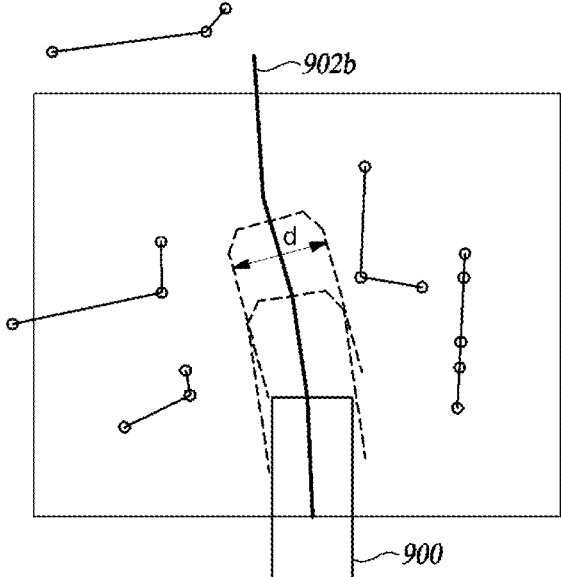

FIGS. 9A and 9B illustrate generation of a safe path that considers a perception error due to a wide-angle camera by a Memory Parking Assist apparatus according to one embodiment of the present disclosure.

The distortion of a wide-angle lens becomes severe as the distance between a wide-angle camera and an obstacle is increased. The position error of an obstacle measured using an SVM wide-angle camera also gets larger as the distance from the camera to the obstacle is increased. In one embodiment, the Memory Parking Assist apparatus may perform a vehicle margin design by reflecting the error due to the obstacle distance by adjusting one or more values of $Lat_{margin}$, $Long_{margin}$, F.Lat, and F.Long.

FIG. 9A shows a process for determining whether a vehicle 900 collides with a nearby obstacle, when navigating along the memory-path 902a, by the Memory Parking Assist apparatus according to one embodiment of the present disclosure. The vehicle margin is designed to increase with distance, considering the perception error of the wide-angle camera. When predicting whether the vehicle 900 will collide with a distant obstacle, the Memory Parking Assist apparatus designs a wider vehicle margin to account for the larger obstacle perception error. However, when predicting whether the vehicle 900 will collide with a nearby obstacle, the Memory Parking Assist apparatus designs the vehicle margin width d to be narrow as shown in FIG. 9A. The vehicle margin width d may be designed to be narrow by setting a small value for $Lat_{margin}$.

FIG. 9B shows a process for generating an avoidance path 902b by the Memory Parking Assist apparatus according to another embodiment of the present disclosure. When generating an avoidance path, the Memory Parking Assist apparatus designs a wider vehicle margin d as shown in FIG. 9B. The vehicle margin width d may be designed to be wide by setting a large value for $Lat_{margin}$. By doing so, a safer avoidance path 902b may be generated.

When predicting whether a collision will occur while navigating along an updated memory-path after updating the memory-path to the avoidance path, the Memory Parking Assist apparatus designs the vehicle margin to be smaller than the vehicle margin considered when generating the avoidance path. As a result, the Memory Parking Assist apparatus may prevent frequent updates of the memory path.

In the domain of autonomous navigation, positioning refers to a technology that determines the position, speed, and path of a vehicle.

For autonomous navigation, positioning uses features of the parking lot environment. An autonomous navigation vehicle calculates features using the images obtained by SVM wide-angle cameras. Since an SVM wide-angle camera uses a wide-angle lens, the positions of features recognized by the autonomous navigation vehicle may not coincide with actual positions. Therefore, errors may occur in positioning employing feature points of the parking lot environment.

Figure 10A:
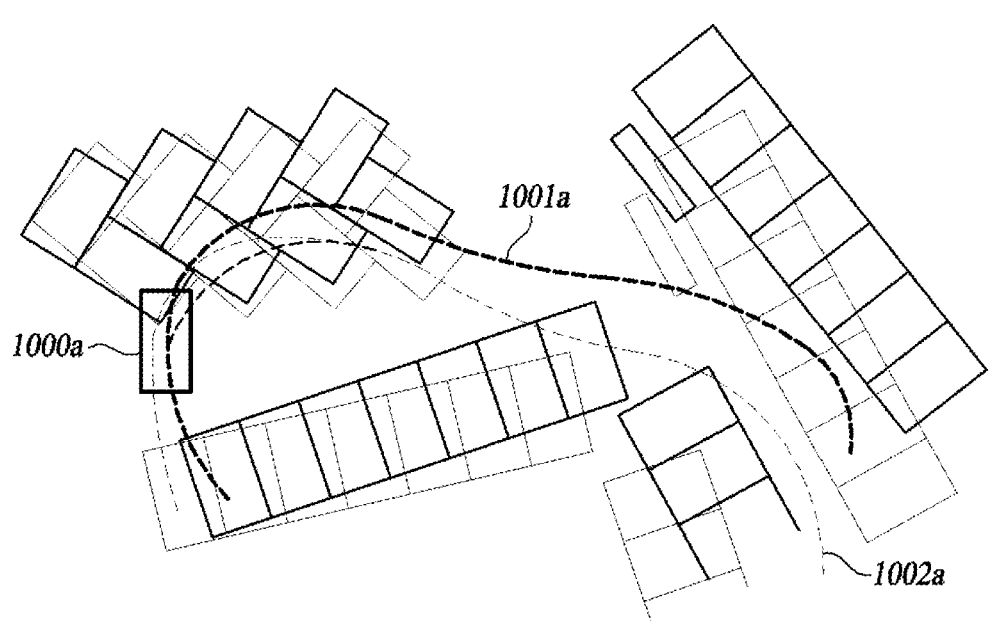
FIGS. 10A and 10B illustrate an operation of a Memory Parking Assist apparatus according to one embodiment of the present disclosure when the vehicle position contains an error.
Figure 10B:
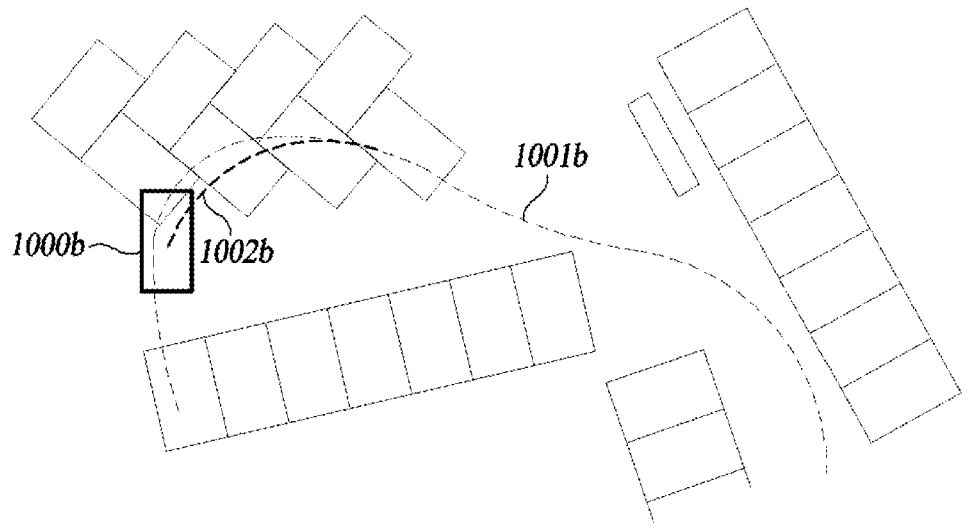

FIGS. 10A and 10B illustrate an operation of a Memory Parking Assist apparatus according to one embodiment of the present disclosure when the vehicle position contains an error.

The Memory Parking Assist apparatus tracks the memory-path using the vehicle's location obtained by positioning. If the vehicle's current position contains an error, the vehicle may follow an erroneous memory-path. When the vehicle navigates along a path with high curvature, the vehicle's navigation path diverges from the memory-path as the positioning error accumulates even if the initial tracking error is small. FIG. 10A shows a situation in which the vehicle's actual navigation path 1001a diverges from the memory-path 1002a due to the positioning error occurred at the vehicle's current position 1000a.

When the vehicle navigates along a path with high curvature and follows the memory-path that includes positioning errors, a problem may occur where the vehicle collides with an obstacle.

To respond to an external environment in real-time, an autonomous navigation vehicle periodically updates the features of the parking lot environment during the navigation process. Since positioning is performed again if features are updated, positioning accuracy is improved consistently.

As shown in FIG. 10B, the Memory Parking Assist apparatus has to update the vehicle's current position each time positioning is performed and generate a convergence path 1002b, along which the vehicle may safely converge to the memory-path 1001b, using the updated current position 1000b. The Memory Parking Assist apparatus has to converge to the memory-path 1001b based on the current position 1000b and, at the same time, generate an avoidance path and a convergence path 1002b along which the vehicle does not collide with an obstacle.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/ timing charts in this specification as being sequentially performed, this is merely a description of the technical idea of one embodiment of the present disclosure. In other words, those having ordinary skill in the art to which one embodiment of the present disclosure belongs may appreciate that various modifications and changes can be made without departing from essential features of an embodiment of the present disclosure, i.e., the sequence illustrated in the flowcharts/timing charts can be changed and one or more operations of the operations can be performed in parallel. Thus, flowcharts/timing charts are not limited to the temporal order.

Although embodiments of the present disclosure have been described for illustrative purposes, those having ordinary skill in the art should appreciate that various modifications, additions, and substitutions are possible, without departing from the idea and scope of the claimed invention. Therefore, embodiments of the present disclosure have been described for the sake of brevity and clarity. The scope of the technical idea of the present embodiments is not limited by the illustrations. Accordingly, one of ordinary skill should understand that the scope of the claimed invention is should not be limited by the above explicitly described embodiments but by the claims and equivalents thereof.

What is claimed is:

1. A method for generating a parking path, the method comprising:

obtaining images around a vehicle by cameras;

obtaining position of the vehicle and obstacles around the vehicle using the images;

activating a Memory Parking Assist (MPA) in response to a determination that the vehicle approaches a memory path;

predicting whether the vehicle collides with any of the obstacles if the vehicle tracks the memory path;

determining whether the obstacles are avoidable in response to a determination that the vehicle is predicted to collide with the obstacle;

generating an avoidance path for the vehicle to avoid the obstacle;

updating the position of the vehicle periodically by using current environment around a parking lot;

determining whether the vehicle tracks the memory path by using the updated position of the vehicle; and generating a convergence path for the vehicle to converge to the memory path when the vehicle deviates the memory path.

2. The method of claim 1, further comprising:

updating the memory path to the avoidance path and the convergence path; and repeatedly predicting whether the vehicle collides with any of the obstacles and repeatedly determining whether the obstacles are avoidable by using the updated memory path.

3. The method of claim 1, wherein a polygon-shaped vehicle margin is applied for predicting whether the vehicle collides with any of the obstacles, determining whether the obstacles are avoidable, generating the avoidance path, and generating the convergence path.

4. The method of claim 3, wherein an area of the vehicle margin increases or decreases according to a distance between the obstacle and the vehicle.

5. The method of claim 2, wherein repeatedly predicting whether the vehicle collides with any of the obstacles and repeatedly determining whether the obstacles are avoidable by using the updated memory path comprises:

applying a decreased vehicle margin compared to the vehicle margin before updating the memory path.

6. The method of claim 1, wherein the avoidance path and the convergence path are clothoid paths.

7. A system for generating a parking path, the system comprising:

a memory device; and a processing device, communicatively coupled to the memory device and configured to:

obtain images around a vehicle by cameras, obtain position of the vehicle and obstacles around the vehicle by using images, activate a Memory Parking Assist (MPA) in response to a determination that the vehicle approaches a memory path, predict whether the vehicle collides with any of the obstacles if the vehicle tracks the memory path, determine whether the obstacles are avoidable in response to a determination that the vehicle is predicted to collide with the obstacle, generate an avoidance path for the vehicle to avoid the obstacle, update the position of the vehicle periodically by using current environment around a parking lot, determine whether the vehicle tracks the memory path by using the updated position of the vehicle, and generate a convergence path for the vehicle to converge to the memory path when the vehicle deviates the memory path.

8. The system of claim 7, wherein the processing device is further configured to:

update the memory path to the avoidance path and the convergence path; and repeatedly predict whether the vehicle collides with any of the obstacles and repeatedly determine whether the obstacles are avoidable by using the updated memory path.

9. The system of claim 7, wherein a polygon-shaped vehicle margin is applied for predicting whether the vehicle collides with any of the obstacles, determining whether the obstacles are avoidable, generating the avoidance path, and generating the convergence path.

10. The system of claim 9, wherein an area of the vehicle margin increases or decreases according to a distance between the obstacle and the vehicle.

11. The system of claim 8, wherein, when whether the vehicle collides with any of the obstacles is repeatedly predicted and whether the obstacles are avoidable is repeatedly determined by using the updated memory path, decreased vehicle margin compared to the vehicle margin before update of the memory path is applied.

12. The system of claim 7, wherein the avoidance path and the convergence path are clothoid paths.

13. A system for generating a parking path, the system comprising:

a memory device; and a processing device, communicatively coupled to the memory device and configured to:

obtain images around a vehicle by cameras, obtain position of the vehicle and obstacles around the vehicle by using images, activate a Memory Parking Assist (MPA) in response to a determination that the vehicle approaches a memory path, predict whether the vehicle collides with any of the obstacles if the vehicle tracks the memory path, determine whether the obstacles are avoidable in response to a determination that the vehicle is predicted to collide with the obstacle, generate an avoidance path for the vehicle to avoid the obstacle, generate a convergence path for the vehicle to converge to the memory path, update the memory path to the avoidance path and the
convergence path, and repeatedly predict whether the vehicle collides with any
of the obstacles and repeatedly determine whether
the obstacles are avoidable by using the updated 5
memory path, wherein, when whether the vehicle collides with any of
the obstacles is repeatedly predicted and whether the
obstacles are avoidable is repeatedly determined by
using the updated memory path, decreased vehicle 10
margin compared to the vehicle margin before update
of the memory path is applied.

* * * * *